United States Patent
Inoue

(10) Patent No.: US 9,606,932 B2
(45) Date of Patent: Mar. 28, 2017

(54) STORAGE DEVICE AND CONTROL METHOD THEREOF

(71) Applicant: KABUSHIKI KAISHA TOSHIBA, Tokyo (JP)

(72) Inventor: Hiroaki Inoue, Yokohama Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 4 days.

(21) Appl. No.: 14/624,507

(22) Filed: Feb. 17, 2015

(65) Prior Publication Data
US 2016/0011983 A1   Jan. 14, 2016

(30) Foreign Application Priority Data
Jul. 11, 2014 (JP) ................................ 2014-143683

(51) Int. Cl.
*G06F 12/00* (2006.01)
*G06F 12/0888* (2016.01)

(52) U.S. Cl.
CPC .. *G06F 12/0888* (2013.01); *G06F 2212/1021* (2013.01); *G06F 2212/1044* (2013.01); *G06F 2212/222* (2013.01); *G06F 2212/608* (2013.01)

(58) Field of Classification Search
CPC ......... G06F 12/0888; G06F 2212/1044; G06F 2212/1021; G06F 2212/608
USPC ....................................................... 711/138
See application file for complete search history.

(56) References Cited

U.S. PATENT DOCUMENTS

| 7,006,318 B2* | 2/2006 | Stence ...................... G06F 1/30 360/69 |
| 8,151,064 B2* | 4/2012 | Lee ........................ G06F 3/0625 360/69 |
| 2011/0246706 A1 | 10/2011 | Gomyo et al. |

FOREIGN PATENT DOCUMENTS

| JP | H08137754 A | 5/1996 |
| JP | 2005-209119 A | 8/2005 |
| JP | 2007034536 A | 2/2007 |
| JP | 2007257718 A | 10/2007 |
| JP | 2007293564 A | 11/2007 |
| JP | 2009237902 A | 10/2009 |
| JP | 2012048361 A | 3/2012 |

OTHER PUBLICATIONS

Japanese Office Action dated Dec. 13, 2016, filed in Japanese counterpart Application No. 2014-143683, 10 pages (with translation).

* cited by examiner

*Primary Examiner* — Jasmine Song
(74) *Attorney, Agent, or Firm* — Patterson & Sheridan, LLP

(57) ABSTRACT

A storage device includes a magnetic storage unit storing data, a semiconductor storage unit, and a controller configured to determine whether or not to control the semiconductor storage unit to store a portion of the data, based on history of access to the data, and control the semiconductor storage unit to store the portion of the data according to the determination.

20 Claims, 7 Drawing Sheets

FIG. 7

| LBA | BLOCK | ATTRIBUTE | STATE OF HDD |
|---|---|---|---|
| 1000h | 2000h | SEQUENTIAL READING | STATIONARY ROTATION |
| 7000h | 300h | NONE | STATIONARY ROTATION |
| 8000h | 80h | NONE | STATIONARY ROTATION |
| 9000h | 62000h | SEQUENTIAL READING | HEAD IN RETREAT AREA |
| ⋮ | ⋮ | ⋮ | ⋮ |

FIG. 8

| STATE OF HDD | OPERATION |
|---|---|
| SPINDLE MOTOR STOPPED | START-UP OF SPINDLE MOTOR, STATIONARY ROTATION OF SPINDLE MOTOR, AND THEN LOADING OF HEAD |
| HEAD IN RETREAT AREA | LOADING OF HEAD |
| STATIONARY ROTATION | — |

STORAGE DEVICE AND CONTROL METHOD THEREOF

CROSS-REFERENCE TO RELATED APPLICATION

This application is based upon and claims the benefit of priority from Japanese Patent Application No. 2014-143683, filed Jul. 11, 2014, the entire contents of which are incorporated herein by reference.

FIELD

Embodiments described herein relate generally to a storage device and a control method thereof.

BACKGROUND

In the related art, in order to achieve both a large data capacity and a high speed of data access, a hybrid drive is configured with a magnetic storage unit and a semiconductor storage unit such as a NAND flash memory. One type of the hybrid drive uses the semiconductor storage unit as a cache for the magnetic storage unit.

DESCRIPTION OF THE DRAWINGS

FIG. 7 illustrates a table structure in a cache information storage unit of a storage device according to a second embodiment.

FIG. 8 shows operations which are carried out before seeking with the head, with respect to each state of a magnetic medium of the storage device according to the second embodiment.

DETAILED DESCRIPTION

An exemplary embodiment provides a storage device which improves a response speed with respect to a read request from a host and a control method thereof.

In general, according to one embodiment, a storage device includes a magnetic storage unit storing data, a semiconductor storage unit, such as NAND memory or flash memory, and a controller configured to determine whether or not to control the semiconductor storage unit to store a portion of the data based on history of accesses to the data, and control the semiconductor storage unit to store the portion of the data according to the determination.

(First Embodiment)

Figure 1:
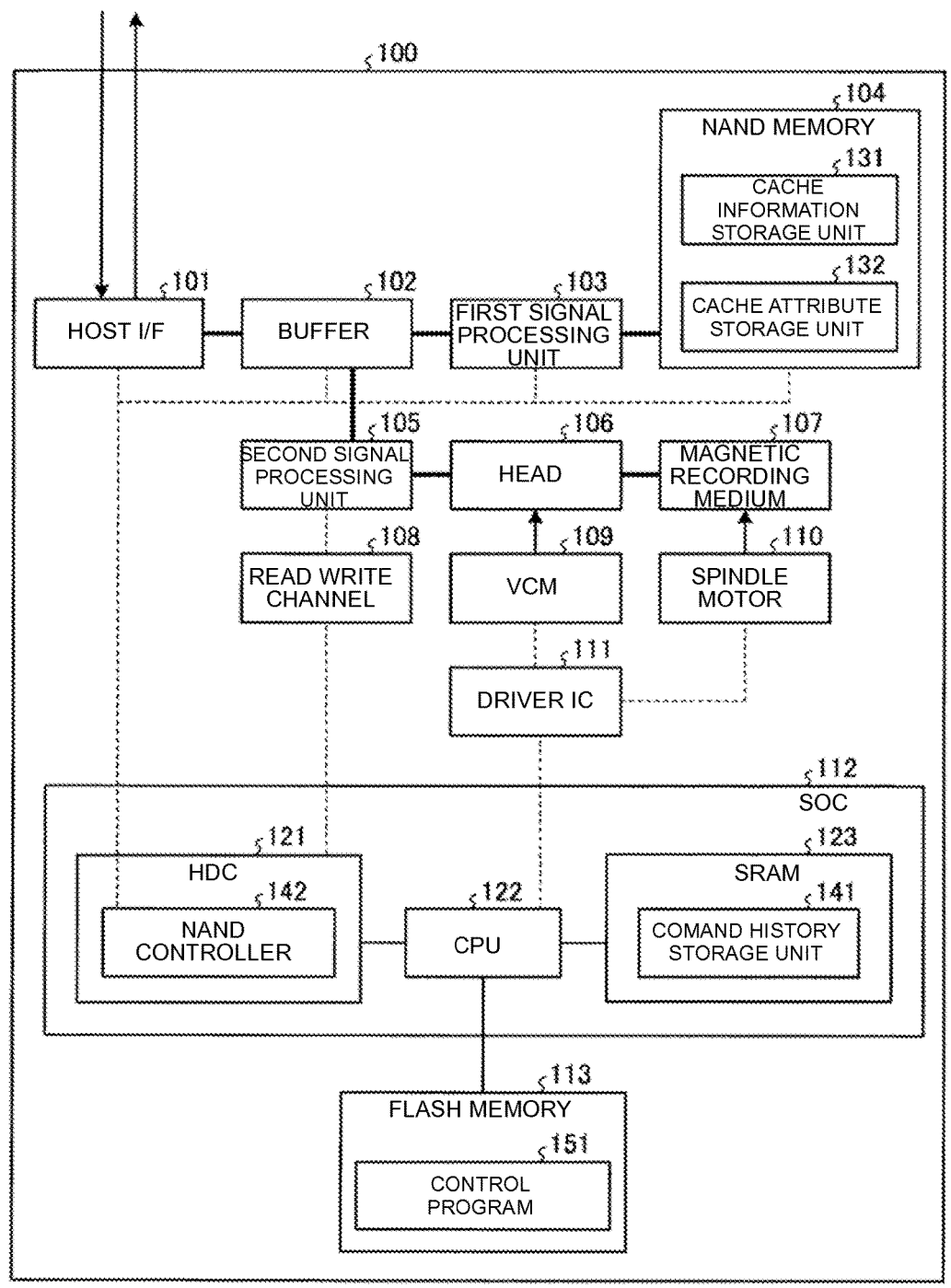
FIG. 1 is a block diagram of a storage device according to a first embodiment.

FIG. 1 is a block diagram of a storage device according to a first embodiment. As illustrated in FIG. 1, a storage device 100 includes a host I/F 101, a buffer 102, a first signal processing unit 103, a NAND memory 104, a second signal processing unit 105, a head 106, a magnetic recording medium 107, a read write channel 108, a VCM 109, a spindle motor 110, a driver IC 111, a main controller 112, and a flash memory 113.

In addition, data reading from the NAND memory 104 is started prior to data reading from the magnetic recording medium 107. For example, even while the magnetic recording medium 107 is rotating in a stationary rotating manner, a seeking time (moving time of head 106) and a rotational delay time are necessary until the data is read from the magnetic recording medium 107. In contrast, since the seeking time and the rotational delay time are not necessary for the NAND memory 104, it is possible to instantly start reading of the data from the NAND memory 104.

The host I/F 101 executes a process corresponding to a standard of an interface compatible with a host (not illustrated). For example, the host I/F 101 outputs a command, data, or the like, received from the host to an HDC 121. In addition, the host I/F 101 transmits data read from the NAND memory 104 or the magnetic recording medium 107, a response from the HDC 121 or a CPU 122, or the like, to the host.

The buffer 102 temporarily stores data received by a NAND controller 142 from a host until the data is stored in the NAND memory 104. In addition, the buffer 102 temporarily stores the data read from the NAND memory 104 until the data is transmitted to the host. In addition, the buffer 102 temporarily stores data read from the magnetic recording medium 107 until the data is transmitted to the host, or is stored in the NAND memory 104. The buffer 102 is configured of a general-purpose memory such as a Static Random Access Memory (SRAM) and a Dynamic Random Access Memory (DRAM), for example.

The first signal processing unit 103 performs a conversion process with respect to data which is received from the buffer 102 and to be written in the NAND memory 104. This conversion process includes, for example, a DA conversion, an encoding process, or the like. In addition, the first signal processing unit 103 performs a conversion process with respect to a signal read from the NAND memory 104. This conversion process includes, for example, an AD conversion, a decoding process, or the like.

The second signal processing unit 105 performs a conversion process with respect to data to be written in the magnetic recording medium 107. This conversion process includes, for example, a DA conversion, an encoding process, or the like. In addition, the second signal processing unit 105 performs a conversion process with respect to a signal read from the magnetic recording medium 107. This conversion process includes, for example, an AD conversion, a decoding process, or the like. In addition, the second signal processing unit 105 may perform detection or an amplification of a signal read by the head 106.

The head 106 writes data with respect to the magnetic recording medium 107. In addition, the head 106 reads data from the magnetic recording medium 107.

The voice coil motor (VCM) 109 is used for a positioning control of the head 106 with respect to the magnetic recording medium 107.

The magnetic recording medium 107 is a plurality of magnetic disks, each being capable of reading and writing data. The spindle motor 110 rotates the plurality of magnetic disks.

The driver IC 111 controls driving of the VCM 109 according to a control of the CPU 122. In addition, the driver IC 111 controls a rotation of the spindle motor 110 according to a control of the CPU 122.

The read write channel 108 performs transmitting of data between the head 106 and the HDC 121. For example, the read write channel 108 performs a code modulation of data which is supplied from the HDC 121 and to be written in the magnetic recording medium 107, and supplies the data to the second signal processing unit 105. In addition, the read write channel 108 performs a code demodulation of data which is read from the magnetic recording medium 107 using the head 106 and converted by the second signal processing unit 105, and outputs the data to the HDC 121 as digital data.

The NAND memory 104 includes a data region and a managing region. The data region is a region in which data from the host or data from the magnetic recording medium 107 is cached, and from which data reading may be performed at a high speed. The managing region stores information for managing the data region of the NAND memory 104, and includes a cache information storage unit 131 and a cache attribute storage unit 132. That is, the cache information storage unit 131 and the cache attribute storage unit 132 are stored in a non-volatile storage unit.

Figure 2:
FIG. 2 illustrates a table structure of a cache information storage unit of the storage device according to the first embodiment.

The cache information storage unit 131 stores information related to data stored in the NAND memory 104. FIG. 2 exemplifies a structure of information stored in the cache information storage unit 131 according to the first embodiment. As illustrated in FIG. 2, the cache information storage unit 131 stores a logical block address (LBA), a block (data size), and an attribute, in association with each other.

The logical block addressing (LBA) denotes a start position of data stored in the NAND memory 104 as a logical address managed by the host. The block denotes a size of the data stored in the NAND memory 104. The attribute denotes an attribute of a command received from the host when accessing the data.

For example, when the cache information storage unit 131 stores LBA of "1000h", a block of "2000h", and an attribute of "sequential reading," it denotes that data by the block of "2000h" is stored in the NAND memory 104 from a start address (LBA) of "1000h".

Meanwhile, for random reading, the seeking time (moving time of head 106) and the rotational delay time are necessary every time a position of data to be read is changed. In contrast, sequential reading enables continuous reading of data after a seeking and a rotational delay have been carried out. For this reason, the sequential reading enables data reading at a relatively high speed after the rotational delay.

Therefore, according to the embodiment, in a case of the sequential reading, data that can be transmitted from the NAND memory 104 to the host during the seeking and the rotational delay is stored in the NAND memory 104. That is, the NAND controller 142 reads data from the NAND memory 104 while the CPU 122 causes the head 106 to perform seeking and the rotational delay through the driver IC 111. In addition, the HDC 121 reads from the magnetic recording medium 107 data subsequent to the data read from the NAND memory 104 according to a command from the CPU 122, when the seeking and the rotational delay are completed. In this manner, since it is possible to perform high speed reading of data during the sequential reading and reduce an amount of data which is stored in the NAND memory 104, the NAND memory 104 may be effectively used.

For this reason, in the cache information storage unit 131, data stored in the NAND memory 104 and an attribute are correlated with each other. As an attribute of a received command, information indicating whether or not it is sequential reading is set.

Figure 3:
FIG. 3 illustrates a table structure of a cache attribute storage unit of the storage device according to the first embodiment.

Returning to FIG. 1, the cache attribute storage unit 132 stores an action to be executed with respect to data stored in the NAND memory 104. FIG. 3 exemplifies a structure of information stored in the cache attribute storage unit 132. As illustrated in FIG. 3, the cache attribute storage unit 132 stores an attribute and an action, in associating with each other. For example, the attribute is set to the same attribute as that of the cache information storage unit 131. That is, when data reading is performed with respect to the NAND memory 104, the CPU 122 searches the cache attribute storage unit 132, using the data and the attribute correlated in the cache information storage unit 131, as searching keys. After the searching, the CPU 122 executes an action which is correlated with the attribute in the cache attribute storage unit 132.

An SOC 112 includes the HDC 121, the CPU 122, and an SRAM 123.

The HDC 121 includes the NAND controller 142, and controls transmission of data between the HDC 121 and the host through the host I/F 101 according to a command from the CPU 122. In addition, the HDC 121 controls writing or reading of data with respect to the magnetic recording medium 107 using the read write channel 108 according to a command from the CPU 122. In addition, the HDC 121 performs a control of the buffer 102, error correction processing of data using the second signal processing unit 105, or the like.

The flash memory 113 stores a program to be executed by the CPU 122, or the like. The flash memory 113 stores, for example, a control program 151.

The SRAM 123 includes a command history storage unit 141. According to the embodiment, the command history storage unit 141 is stored in the SRAM 123; however, the command history storage unit 141 may not be located in the SRAM 123, and may be located in a DRAM, or the like, for example.

The command history storage unit 141 stores a history of commands received by the host I/F 101 (for example, read request or write request) along with a position of an access destination of each command (start position of data). The command history storage unit 141 according to the embodiment stores the command received from the host (for example, read request or write request), a start position of data to access (LBA), the number of blocks which are read or written, and a time when the command is received, in association with each other.

According to the embodiment, the CPU 122 registers information related to the received command with respect to the command history storage unit 141, every time the host I/F 101 receives a command from the host. Since the command history storage unit 141 is correlated with a point of time when the command is received, or the like, for every command, it is possible to determine whether or not the command is a request for reading data sequentially. That is, in the command history storage unit 141, a start position of data for which a read request is made, and information which may specify whether or not the read request is sequential reading are stored.

The CPU 122 performs the entire control of the storage device 100. For example, the CPU 122 performs a control of rotating the spindle motor 110 through the driver IC 111. As another example, the CPU executes the control program 151 stored in the flash memory 113.

Figure 4:
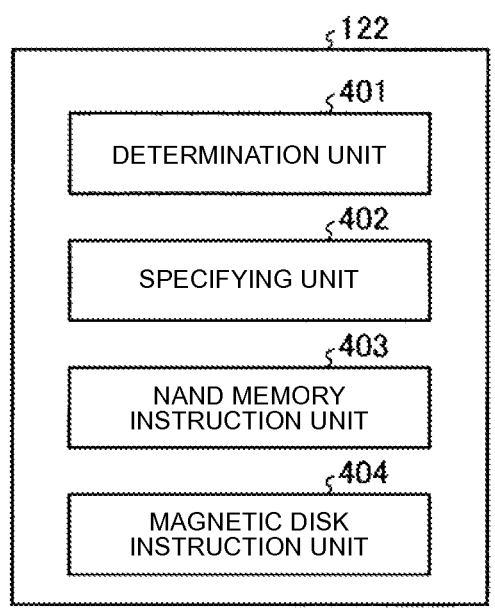
FIG. 4 is a block diagram of elements generated when a CPU of the storage device according to the first embodiment executes a control program.

FIG. 4 exemplifies units generated when the CPU 122 executes the control program 151. As illustrated in FIG. 4, a determination unit 401, a specifying unit 402, a NAND memory instruction unit 403, and a magnetic disk instruction unit 404 are generated.

The determination unit 401 determines whether or not to store (cache) data stored in the magnetic recording medium. 107 in the NAND memory 104 based on information stored in the command history storage unit 141. A standard for determining whether or not to store (cache) the data may be any standard regardless of whether or not it is a well-known standard. For example, the standard may be whether or not there are read requests of a predetermined number or more with respect to the same data.

The specifying unit 402 specifies a start position and a block with respect to data to be cached. For example, when data which has been subjected to sequential reading in NAND memory 104 is cached, the specifying unit 402 specifies a block of data to be read from the NAND memory 104 among data items to be subjected to the sequential reading, based on a time during which the head 106 becomes ready to start reading from the magnetic recording medium 107 (for example, time necessary for seeking and rotational delay). In addition, the specifying unit 402 specifies a start position of data to be subjected to the sequential reading as a start position of the data to be cached.

The magnetic disk instruction unit 404 instructs the HDC 121 to read or write data. For example, the magnetic disk instruction unit 404 instructs the HDC 121 so that several blocks of data from the start position of data specified by the specifying unit 402 are to be read.

The NAND memory instruction unit 403 instructs the NAND controller 142 to read or write data. For example, the NAND memory instruction unit 403 instructs the NAND controller 142 so that data which has been read using the HDC 121 according to an instruction from the magnetic disk instruction unit 404 is written in the NAND memory 104. At this time, the NAND memory instruction unit 403 instructs the NAND controller 142 so that information related to the data written in the NAND memory 104 is registered in the cache information storage unit 131.

That is, the CPU 122 according to the embodiment writes the data stored in the magnetic recording medium 107 in the NAND memory 104 based on information stored in the command history storage unit 141. At this time, the CPU 122 registers a reading position of the data and an attribute indicating whether or not it is sequential reading, in the cache information storage unit 131 in association with each other.

In this manner, according to the embodiment, when data subjected to sequential reading is cached in the NAND memory 104, it is possible to cache only a part of data items that is a starting portion of the data. In addition, when the host I/F 101 receives a read request from the host, the following process will be performed.

The determination unit 401 determines whether or not data to be read is stored in the NAND memory 104 according to a read request received by the host I/F 101. The determination unit 401 according to the embodiment determines whether or not the data to be read is stored in the NAND memory 104 with reference to the cache information storage unit 131. In addition, the determination unit 401 determines whether or not there is a high possibility that the read request may be sequential reading with reference to the cache information storage unit 131. According to the embodiment, when the data to be read corresponds to the attribute "sequential reading" in the cache information storage unit 131, it is determined that there is a high possibility of sequential reading.

The specifying unit 402 specifies a start position of data (LBA) on the magnetic recording medium 107 in which data which is subsequent to the data read from the NAND memory 104 is stored, when it is determined that there is a high possibility of sequential reading.

The NAND memory instruction unit 403 instructs the NAND controller 142 so that the data is read from the NAND memory 104 when it is determined that the data which is read according to the read request is stored in the NAND memory 104.

The magnetic disk instruction unit 404 instructs the HDC 121 so that the data is read from the magnetic recording medium 107 when it is determined that the data which is read according to the read request is not stored in the NAND memory 104.

In addition, the magnetic disk instruction unit 404 controls the HDC 121 and the driver IC 111 so that data subsequent to the data read from the NAND memory 104 is read from the magnetic recording medium 107, when it is determined that the data which is read according to the read request is stored in the NAND memory 104 and that there is a high possibility of sequential reading.

Accordingly, the CPU 122 performs a movement control so that the head 106 is moved to a position of the magnetic disk in which the data which is subsequent to the data read from the NAND memory 104 through the driver IC 111, while the data is read from the NAND memory 104. After the movement control, the CPU 122 performs a reading control of reading data from the magnetic recording medium 107 through the HDC 121. According to the embodiment, a reading position of data for which a read request is made is stored in the cache information storage unit 131, and when the reading position is correlated with the "sequential reading" in the cache information storage unit 131, the movement control and the reading control are performed.

Figure 5:
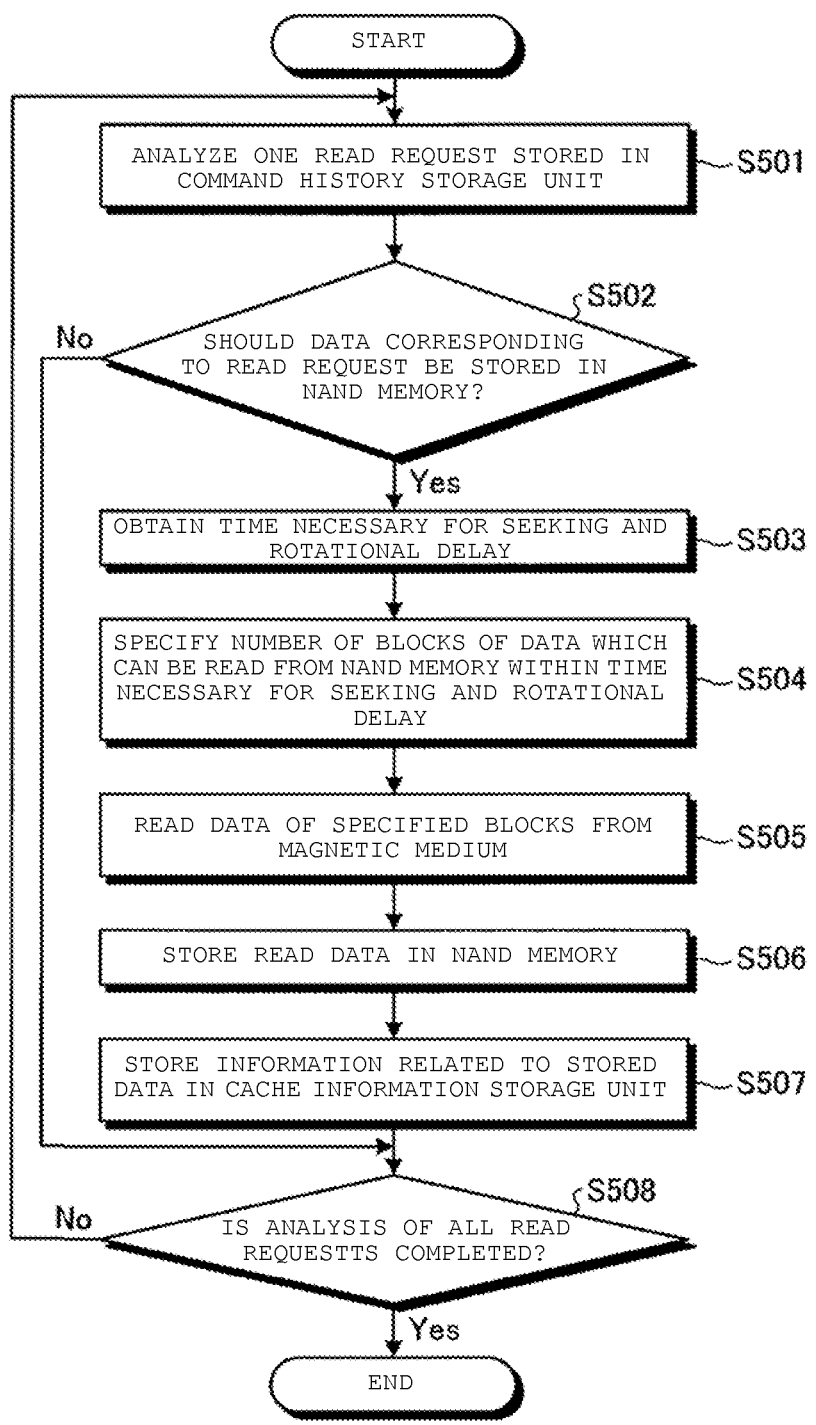
FIG. 5 is a flowchart of caching process with respect to a NAND memory of the storage device according to the first embodiment.

Subsequently, a process of caching data in the NAND memory 104 of the storage device 100 according to the embodiment will be described. FIG. 5 is a flowchart of the above described process carried out by the storage device 100 according to the embodiment.

First, the determination unit 401 of the CPU 122 analyzes a past read request stored in the command history storage unit 141 (process S501). Subsequently, the determination unit 401 determines whether or not the data corresponding to the read request is to be cached in the NAND memory 104 (process S502). When the data is determined not to be cached (No in process S502), the process proceeds to process S508.

On the other hand, when it is determined that the data is to be cached (Yes in process S502), the specifying unit 402 of the CPU 122 obtains a time which is necessary for seeking and rotational delay (process S503). Here, according to the embodiment, a total of a mean seeking time and a mean rotational delay time when reading data from the magnetic recording medium 107 is used to obtain the time necessary for seeking and rotational delay. However, the time necessary for seeking and rotational delay is not limited to the total of a mean seeking time and a mean rotational delay time, and may be a total of a maximum seeking time and a maximum rotational delay time, for example.

In addition, the specifying unit 402 specifies the number of blocks of data that can be read from the NAND memory 104 within the obtained time, which is necessary for seeking and rotational delay (process S504).

Subsequently, the magnetic disk instruction unit 404 of the CPU 122 instructs the HDC 121 to read data of the specified number of blocks from a start position of a read request, from the magnetic recording medium 107 (process S505).

In addition, the NAND memory instruction unit 403 of the CPU 122 instructs the NAND controller 142 to store the read data in the NAND memory 104 (process S506).

The NAND memory instruction unit 403 of the CPU 122 instructs the NAND controller 142 to store information related to the data stored in the NAND memory 104 in the cache information storage unit 131 (process S507). The NAND memory instruction unit 403 controls the cache information storage unit 131 to store a reading start position (LBA) of the data stored in the magnetic recording medium 107, a block (length) of the stored data, and an attribute of the stored data, in association with each other. In addition, as the attribute, at least information indicating whether or not the stored data has been accessed through sequential reading is included.

Thereafter, the determination unit 401 determines whether or not analyzing all of read requests stored in the command history storage unit 141 is completed (process S508). When it is determined that analyzing all of the read requests is not completed (No in process S508), process S501 is performed again. When the determination unit 401 determines that analyzing all of the read requests is completed (Yes in process S508), the process is ended.

Figure 6:
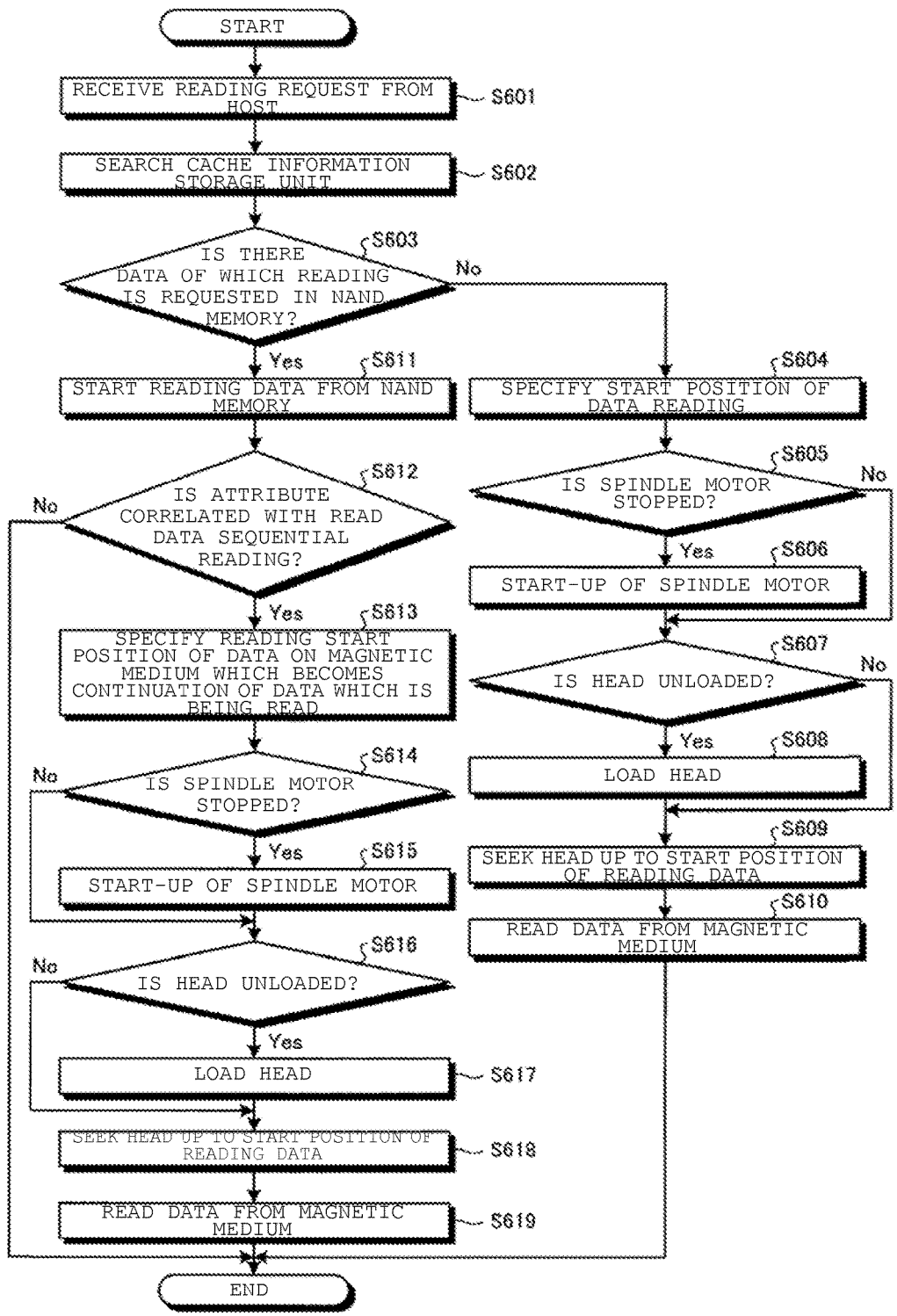
FIG. 6 is a flowchart of a data reading process in the storage device according to the first embodiment.

Subsequently, a reading process of data in the storage device 100 according to the embodiment will be described. FIG. 6 is a flowchart of the above described process carried out by the storage device 100 according to the embodiment.

First, the host I/F 101 receives a read request of data from the host (process S601). Subsequently, the NAND memory instruction unit 403 of the CPU 122 requests the NAND controller 142 to search the cache information storage unit 131 for data for which a read request is made (process S602). In addition, the determination unit 401 determines whether or not there is data for which the read request is made in the NAND memory 104 (process S603).

When it is determined that there is no data for which the read request is made in the NAND memory 104 (No in process S603), the specifying unit 402 specifies a start position of data reading (LBA) with respect to the magnetic recording medium 107 (process S604). In addition, the driver IC 111 starts a preparation for the reading according to a request from the CPU 122.

The driver IC 111 determines whether or not the spindle motor 110 is stopped (process S605). When it is determined that the spindle motor 110 is not stopped (No in process S605), the process proceeds to process S607. On the other hand, when it is determined that the spindle motor 110 is stopped (Yes in process S605), the driver IC 111 performs a start-up control of the spindle motor 110 (process S606).

Subsequently, the driver IC 111 determines whether or not the head 106 is unloaded (process S607). When it is determined that the head 106 is loaded (No in process S607), the process proceeds to process S609. On the other hand, when it is determined that the head 106 is unloaded (Yes process S607), the driver IC 111 loads the head 106 (process S608).

Thereafter, the driver IC 111 performs seeking with the head 106 up to a specified reading start position (LBA) (process S609). Then, the HDC 121 reads data for which the read request is made from the magnetic recording medium 107 according to the CPU 122 (process S610).

On the other hand, when it is determined that there is data for which the read request is made in the NAND memory 104 (Yes in process S603), the NAND memory instruction unit 403 instructs the NAND controller 142 to start reading data from the NAND memory 104 (process S611).

Subsequently, the determination unit 401 determines whether or not the attribute which is associated with the data of which reading is started is sequential reading (process S612). When determining that it is not sequential reading (No in process S612), the process is ended.

On the other hand, when the determination unit 401 determines that it is sequential reading (Yes in process S612), the specifying unit 402 specifies a reading start position of data which becomes a continuation of the data which is read from the NAND memory 104 on the magnetic recording medium 107 (process S613). As the specifying method, for example, a reading start position of data stored in the cache information storage unit 131, and an address after blocks which are correlated are specified as data start positions. In addition, the driver IC 111 starts a preparation for reading according to a request from the CPU 122. In addition, data reading is performed in the same processing order as those in processes S605 to S610 (processes S614 to S619).

In the storage device 100 according to the embodiment, operation is different depending on whether or not a read request is sequential reading. For example, when caching is performed in the NAND memory 104, only a part of data items at the head is cached. At this time, the NAND memory instruction unit 403 controls the cache information storage unit 131 to store an attribute indicating that the read request is the sequential reading (sequential reading is continued) in association with the cached data. When the cache data is associated with the attribute "sequential reading," the head 106 is moved to a position at which the data cached in the NAND memory 104 ends, while reading the cache data from the NAND memory 104.

In addition, timing for caching data of the magnetic recording medium 107 in the NAND memory 104 is not limited, and, for example, the caching may be performed during idle time of the storage device 100.

(Second Embodiment)

In the first embodiment, an attribute indicating whether or not the read request is sequential reading is correlated with cached data in the NAND memory 104. However, information correlated with data to be read is not limited to the attribute, and the length of data to be stored in the NAND memory 104 may be determined based on other conditions.

In the second embodiment, data to be read and a state of an HDD are correlated in the cache information storage unit 131.

According to the embodiment, descriptions of each configuration will be omitted by assuming that the second embodiment has the same configurations as those in the first embodiment except for the configuration of the cache information storage unit 131 which is provided in the NAND memory 104, and the configuration of the command history storage unit 141.

FIG. 7 exemplifies a table structure of a cache information storage unit 131 according to the second embodiment. As illustrated in FIG. 7, the cache information storage unit 131 stores an LBA, a block, an attribute, and a state of an HDD in association with each other. In the cache information storage unit 131 according to the embodiment, the state of the HDD is correlated, as compared to the cache information storage unit 131 according to the first embodiment.

The state of the HDD here is a state of the magnetic recording medium 107 when a read request for correlated data is received. That is, according to the embodiment, when a host I/F 101 receives a command, a CPU 122 controls the command history storage unit 141 to store the state of the magnetic recording medium 107 when the command is received in association with information related to the command.

In addition, when the data is cached in the NAND memory 104 based on information stored in the command history storage unit 141, the NAND controller 142 controls the cache information storage unit 131 to store the state of the HDD in association with the data to be cached.

Meanwhile, operations which are necessary until data reading becomes ready are different depending on the state of the magnetic recording medium 107 (HDD). FIG. 8 shows operations which are necessary before seeking with the head 106 becomes ready in association with the state of the magnetic recording medium 107 (HDD). As illustrated in FIG. 8, operation states of the magnetic recording medium 107 (HDD) and the head 106 include "spindle motor stopped", "head in a retreat area", and a "stationary rotation".

"Spindle motor stopped" is an operation state in which a rotation of a magnetic disk included in the magnetic recording medium 107 is stopped and the head 106 is in a retreat area, which is referred to as a ramp. As illustrated in FIG. 8, when the spindle motor 110 is stopped, the spindle motor 110 is started up, and is rotated before data is read. Thereafter, it is necessary to move (float) the head 106 onto the magnetic disk of the magnetic recording medium 107 (head loading).

"Head in a retreat area" is an operation state in which the spindle motor 110 rotates, and the head 106 is in a retreat area. As illustrated in FIG. 8, when the head 106 is in a retreat area, it is necessary to perform head loading.

"Stationary rotation" is an operation state in which the spindle motor 110 rotates, and the magnetic head is on a magnetic medium. As illustrated in FIG. 8, when it is in the state of "stationary rotation," only the seeking time and the rotational delay time of the head 106 are needed for data reading from the magnetic recording medium 107 to become ready.

Figure 9:
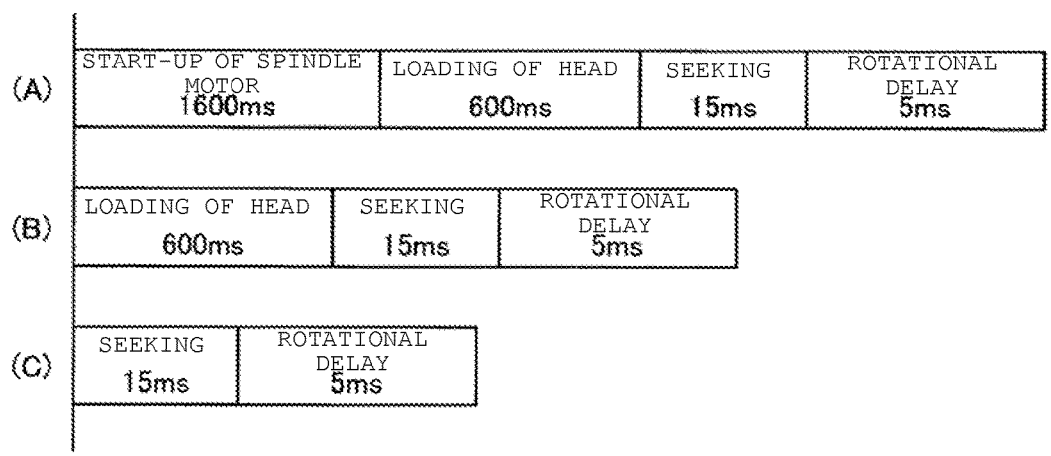
FIG. 9 shows a time period before data reading with respect to each state of the magnetic medium of the storage device according to the second embodiment.

FIG. 9 shows a time required before data reading from the magnetic recording medium 107 becomes ready with respect each of the states of the magnetic recording medium 107 and the head 106 in the storage device 100 according to the embodiment. As illustrated in (A) of FIG. 9, during "spindle motor stopped," a time of 2,220 ms (1,600 ms (start-up of spindle motor)+600 ms (head loading)+15 ms (seeking)+5 ms (rotational delay)) is necessary before data reading becomes ready. The CPU 122 stores data which may be read within 2,220 ms in the NAND memory 104. In this manner, the specifying unit 402 specifies an amount to be cached in the NAND memory 104 by calculating a start-up time of the spindle motor 110, and a time during which the head 106 moves to the magnetic recording medium 107, when the spindle motor 110 is stopped.

As illustrated in (B) of FIG. 9, when it is "unloaded," a time of 620 ms (600 ms (head loading)+15 ms (seeking)+5 ms (rotational delay)) is necessary until the data reading becomes ready. For this reason, the CPU 122 stores data which may be read within 620 ms in the NAND memory 104. In this manner, the specifying unit 402 specifies an amount to be cached in the NAND memory 104 by calculating a time in which the head 106 is moved to the magnetic recording medium 107, when the head 106 is in the retreat area.

As illustrated in (C) of FIG. 9, during "stationary rotation," a time of 20 ms (15 ms (seeking)+5 ms (rotational delay)) is necessary until data reading becomes ready. For this reason, the CPU 122 stores data which may be read within 20 ms in the NAND memory 104.

In this manner, the CPU 122 according to the embodiment determines the length of data to be written in the NAND memory 104 according to the states of the magnetic recording medium 107 and the head 106 when a reading command is received (in other words, states of magnetic recording medium 107 and head 106 when a command is received that are stored in command history storage unit 141).

For example, in cases of "spindle motor stopped" and "head is in a retreat area," an amount of data to be recorded in the NAND memory 104 as cache becomes large, as compared to the case of "stationary rotation."

In this manner, when there is a read request for the data, the cache information storage unit 131 of the NAND memory 104 according to the embodiment stores the data to be read in association with an attribute related to the read request such as a state of the magnetic recording medium 107, or the like, while the data to be read is cached in the cache information storage unit 131. Since the processes which are performed during data reading are the same as those in the first embodiment, descriptions thereof will be omitted.

In the above described embodiment, the cache information storage unit 131 stores a reading position, a size of data, and information indicating whether or not the data reading is sequential reading in association with each other. In this manner, when the host I/F 101 receives a read request of data, it is possible to determine whether or not there is a high possibility that the data may be sequentially read. Accordingly, when it is determined that there is a high possibility of sequential reading when receiving a read request of data by the host I/F 101, the CPU 122 may move the head 106 to a position of data that is subsequent to data that is being read from the NAND memory 104. In this manner, it is possible to improve a response speed in a case of sequential reading.

In the storage device 100 according to above described embodiment, data for which a read request may be received in the future is read from a disk among data associated in a command history, and is stored in the NAND memory 104. In addition, in a case of sequential reading, an amount of data corresponding to a time before the head 106 becomes ready for data reading is stored in the NAND memory 104. As too much data is not stored in the NAND memory 104, it is possible to reduce the number of writing times in the NAND memory 104, and to effectively use the NAND memory 104. As a result, it is possible to suppress deterioration of the NAND memory 104, and to improve a hit rate. In addition, since it is possible to perform data reading instantly when sequential reading is performed, it is possible to improve response speed.

That is, in the above described embodiment, since it is possible to continuously read data of the magnetic recording medium 107 after reading data from the NAND memory 104 when it is sequential reading, sequential reading can be performed without discontinuation of the data reading. Accordingly, it is possible to maintain and improve efficiency of the NAND memory 104 while preserving usage of the NAND memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
    a disk storage unit;
    a semiconductor storage unit; and
    a controller circuit configured to
        determine whether or not to store a starting portion of sequential data into the semiconductor storage unit based on history of accesses to the sequential data, which are stored in the disk storage unit, and
        control the semiconductor storage unit to store the starting portion of the sequential data according to the determination.

2. The storage device according to claim 1, wherein
    the controller circuit is further configured to determine a data length of the starting portion of the sequential data to be stored in the semiconductor storage unit, based on a time period necessary for the disk storage unit to become ready for reading of data, and control the semiconductor storage unit to store the starting portion of the sequential data having the determined data length.

3. The storage device according to claim 2, wherein
    the history of accesses indicates an operational state of the disk storage unit when the sequential data has been accessed, and
    the controller circuit is further configured to calculate the time period based on the operational state of the disk storage unit.

4. The storage device according to claim 2, further comprising:
    a second semiconductor storage unit, wherein
    the controller circuit is further configured to control the second semiconductor storage unit to store a data starting position of the sequential data in the disk storage unit, a data length of the sequential data, and an attribute of the sequential data, based on the history.

5. The storage device according to claim 4, wherein
    the controller circuit is further configured to
    determine whether or not a read request designates the sequential data, and
    cause the starting portion of the sequential data to be read out from the semiconductor storage unit, and a portion of the sequential data that is subsequent to the starting portion to be read out from the disk storage unit, in the case the controller circuit determines that the read request designates the sequential data.

6. The storage device according to claim 5, wherein
    the controller circuit determines whether or not the read request designates the sequential data, based on the data starting position and the data length stored in the second semiconductor storage unit.

7. The storage device according to claim 4, wherein
    the attribute indicates whether or not the access to the sequential data is a sequential access.

8. The storage device according to claim 4, wherein
    the history of accesses indicates an operational state of the disk storage unit when the sequential data has been accessed, and
    the attribute indicates the operational state of the disk storage unit.

9. The storage device according to claim 8, wherein
    the disk storage unit includes a magnetic disk and a head, and
    the operational state indicates a rotational state of the magnetic disk and a position of the head.

10. The storage device according to claim 1, wherein
    the controller circuit is further configured to
        determine whether or not a read request designates the sequential data, and
        cause the starting portion of the sequential data to be read out from the semiconductor storage unit, and a portion of the sequential data that is subsequent to the starting portion to be read out from the disk storage unit, when the controller circuit determines that the read request designates the sequential data.

11. A method for controlling a storage device including a disk storage unit and a semiconductor storage unit, the method comprising:
    storing sequential data in the disk storage unit;
    storing history of access to the sequential data that are stored in the disk storage unit;
    determining that a starting portion of the sequential data is to be stored in the semiconductor storage unit based on the history, and
    storing the starting portion of the sequential data in the semiconductor storage unit.

12. The method according to claim 11, further comprising:
    determining a data length of the starting portion of the sequential data to be stored in the semiconductor storage unit, based on a time period necessary for the disk storage unit to become ready for reading of data, wherein
    the starting portion of the sequential data stored in the semiconductor storage unit has the determined data length.

13. The method according to claim 12, wherein the history of accesses indicates an operational state of the disk storage unit when the sequential data has been accessed, the method further comprising:
    calculating the time period based on the operational state of the disk storage unit.

14. The method according to claim 12, further comprising:
    storing a data starting position of the sequential data in the disk storage unit, a data length of the sequential data, and an attribute of the sequential data, based on the history.

15. The method according to claim 14, wherein
    the attribute indicates whether or not the access to the sequential data is a sequential access.

16. The method according to claim 14, wherein
    the history of accesses indicates an operational state of the disk storage unit when the sequential data has been accessed, and
    the attribute indicates the operational state of the disk storage unit.

17. The method according to claim 16, wherein
    the disk storage unit includes a magnetic disk and a head, and the operational state includes a rotational state of the magnetic disk and a position of the head.

18. The method according to claim 11, further comprising:
   determining whether or not a read request designates the sequential data; and
   reading out the starting portion of the sequential data from the semiconductor storage unit, and a portion of the sequential data that is subsequent to the starting portion from the disk storage unit, when it is determined that the read request designates the sequential data.

19. A storage device comprising:
   a disk storage unit;
   a semiconductor storage unit; and
   a controller circuit configured to, in a case that sequential data is stored in the disk storage unit and a starting portion of the sequential data is stored in the semiconductor storage unit,
      cause the starting portion of the sequential data to be read out from the semiconductor storage unit, and
      cause a subsequent portion of the sequential data that is subsequent to the starting portion to be read out from the disk storage unit.

20. The storage device according to claim 19, wherein the subsequent portion is read out after the starting portion is read out from the semiconductor storage unit.

* * * * *